United States Patent
Kim et al.

(10) Patent No.: US 11,269,089 B2
(45) Date of Patent: Mar. 8, 2022

(54) DIGITAL X-RAY DETECTOR

(71) Applicant: LG Display Co., Ltd., Seoul (KR)

(72) Inventors: Jinpil Kim, Paju-si (KR); Hanseok Lee, Goyang-si (KR); Sangmo Byun, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 42 days.

(21) Appl. No.: 16/717,863

(22) Filed: Dec. 17, 2019

(65) Prior Publication Data
US 2020/0209413 A1    Jul. 2, 2020

(30) Foreign Application Priority Data
Dec. 27, 2018  (KR) .......................... 10-2018-0170946

(51) Int. Cl.
*G01T 1/20* (2006.01)
*G01T 1/24* (2006.01)

(52) U.S. Cl.
CPC .......... *G01T 1/2018* (2013.01); *G01T 1/2002* (2013.01); *G01T 1/241* (2013.01)

(58) Field of Classification Search
CPC ..... G01T 1/2018; G01T 1/2002; G01T 1/241; G01T 1/20188; G01T 1/2023; H01L 31/115
See application file for complete search history.

(56) References Cited

U.S. PATENT DOCUMENTS

| 2008/0078938 | A1* | 4/2008 | Vafi ....................... G01T 1/2018 250/370.09 |
| 2012/0126126 | A1* | 5/2012 | Yokoyama ........ H01L 27/14676 250/366 |
| 2016/0027847 | A1* | 1/2016 | Liu ..................... H01L 51/0097 378/62 |
| 2016/0178763 | A1* | 6/2016 | Okada ................. H01L 31/0272 250/370.09 |
| 2018/0234642 | A1* | 8/2018 | Langley ................ H01L 23/552 |

FOREIGN PATENT DOCUMENTS

KR    10-2012-0082729 A    7/2012
KR    10-2016-0076005 A    6/2016

* cited by examiner

*Primary Examiner* — David P Porta
*Assistant Examiner* — Mamadou Faye
(74) *Attorney, Agent, or Firm* — Seed IP Law Group LLP

(57) ABSTRACT

The present disclosure relates to a digital X-ray detector, which includes a base substrate; a metal layer disposed on a bottom face of the base substrate; an elements-array disposed on a top face of the base substrate; a ground electrode disposed on a top face of the base substrate and electrically connected to the elements-array; a scintillator layer disposed on the elements-array; and a reflective plate disposed on the scintillator layer. Thus, a static-electricity discharge path along which static-electricity from the reflective plate moves through the ground electrode to the metal layer may be secured. This may increase or maximize an effective ground region, such that the static-electricity generated from the top and bottom of the digital X-ray detector can be more efficiently discharged out.

11 Claims, 5 Drawing Sheets

DIGITAL X-RAY DETECTOR

CROSS-REFERENCE TO RELATED APPLICATION

This application claims the priority of Korean Patent Application No. 10-2018-0170946 filed on Dec. 27, 2018 in the Korean Intellectual Property Office, the disclosure of which is hereby incorporated by reference in its entirety.

BACKGROUND

Technical Field

The present disclosure relates to a digital X-ray detector.

Description of the Related Art

X-ray has a short wavelength which allows the X-ray to transmit through an object easily. The transmittance of an X-ray depends on an inner density of the object. Therefore, an internal structure of the object may be observed by detecting the transmittance of the X-ray as transmitted through the object.

One of X-ray based inspection methods used in a medical field is a film printing scheme. However, in the film printing scheme, in order to check a result, an image is shot, and then a film is printed. Thus, it takes a long time to check the result. Especially, in the film printing scheme, there are many difficulties in storing and preserving the printed film.

Recently, a digital X-ray detector (DXD) using a thin-film transistor has been developed and widely used in the medical field.

The digital X-ray detector detects the transmittance of the X-ray transmitted through the object and displays an internal state of the object on a display based on the transmittance.

Therefore, the digital X-ray detector may display the internal structure of the object without using a separate film or a printed paper. Further, the DXD has an advantage that the result may be checked in real time immediately after X-ray photographing.

BRIEF SUMMARY

The present disclosure provides a digital X-ray detector in which electrostatic defects are reduced or minimized.

Further, the present disclosure provides a digital X-ray detector in which element variation and frictional static-electricity due to polyimide-based impurities that may be generated when using a polyimide substrate are reduced or minimized.

The advantages of the present disclosure are not limited to the above. Other advantages of the present disclosure, as not mentioned above, may be understood from the following descriptions and more clearly understood from the embodiments of the present disclosure. Further, it will be readily appreciated that the purposes and advantages of the present disclosure may be realized by features and combinations thereof as disclosed in the claims.

In one aspect of the present disclosure, there is proposed a digital X-ray detector that includes: a base substrate; a metal layer disposed on a bottom face of the base substrate; an elements-array disposed on a top face of the base substrate; a ground electrode disposed on a top face of the base substrate and electrically connected to the elements-array; a scintillator layer disposed on the elements-array; and a reflective plate disposed on the scintillator layer, wherein the reflective plate is electrically connected to the ground electrode, and wherein the ground electrode is electrically connected to the metal layer.

In this connection, the base substrate includes a glass substrate.

In another aspect of the present disclosure, there is proposed the digital X-ray detector that includes: a base substrate; a metal layer on the base substrate; a multi-buffer layer on the metal layer; an element-array disposed on the multi-buffer layer; a ground electrode disposed on the multi-buffer layer, the ground electrode being electrically connected to the element array; a scintillator layer on the elements-array; and a reflective plate on the scintillator layer, wherein the reflective plate is electrically connected to the ground electrode, and wherein the ground electrode is electrically connected to the metal layer.

In this connection, the base substrate includes a polyimide (PI) substrate and the digital X-ray detector may be embodied as a flexible type digital X-ray detector.

According to the present disclosure, a static-electricity discharge path along which the static-electricity from the reflective plate moves through the ground electrode to the metal layer may be secured. This may reduce both the static-electricity generated from the top and bottom of the digital X-ray detector.

Further, in accordance with the present disclosure, the static-electricity discharge path along which the static-electricity from the reflective plate moves through the ground electrode to the metal layer may be secured. This may increase or maximize the effective ground region, such that the static-electricity generated from the top and bottom of the digital X-ray detector can be more efficiently discharged out.

According to the present disclosure, electrical connections between the metal layer, the ground electrode and the reflective plate are established, thereby ensuring a wide effective ground region to which the static-electricity escapes. This may reduce or minimize defects caused by the static-electricity resulting from the production, testing and use of the digital X-ray detector and by the static-electricity resulting from the charges accumulated on the reflective plate during X-ray irradiation.

Further, according to the present disclosure, when the digital X-ray detector includes the polyimide based substrate, the metal layer may be formed between the polyimide substrate and the elements-array. This reduces or minimizes the influence of the polyimide impurities while securing a wide effective ground region through which static-electricity escapes, thereby reducing or minimizing the failure due to the static electricity.

In addition to the above effects, further effects of the present disclosure are described below in conjunction with descriptions of specific details to implement the present disclosure.

DETAILED DESCRIPTION

Figure 1:
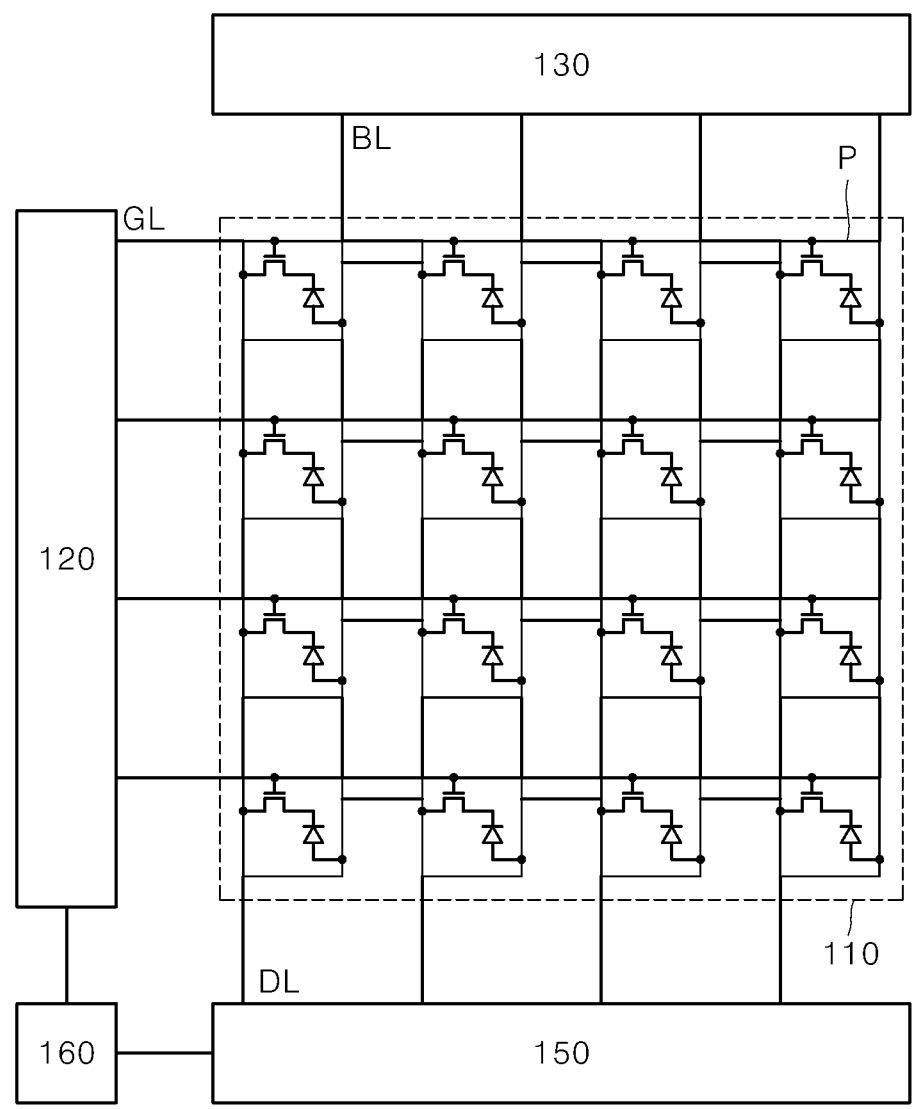
FIG. 1 is a block diagram for schematically illustrating a digital X-ray detector.

For simplicity and clarity of illustration, elements in the figures are not necessarily drawn to scale. The same reference numbers in different figures denote the same or similar elements, and as such perform similar functionality. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

It will be understood that, although the terms "first," "second," "third," and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers. It will be understood that when an element or layer is referred to as being "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, digital X-ray detectors according to some embodiments of the present disclosure are described.

FIG. 1 is a block diagram for schematically describing the digital X-ray detector. The digital X-ray detector includes a thin-film transistor array 110, a gate driver 120, a bias supply 130, a readout circuitry 150, and a timing controller 160. Other circuitries or components may be included in the digital X-ray detector and is not necessarily limited to those listed above.

The thin-film transistor array 110 includes a plurality of cell regions defined by a plurality of gate lines GL arranged in a first direction and by a plurality of data lines DL arranged in a second direction orthogonal to the first direction. The cell regions are arranged in a matrix form. In each cell region, photo-sensitive pixels Ps may be formed. The thin-film transistor array 110 detects the X-ray emitted from an X-ray source and converts the detected X-ray into an electrical signal and outputs the electrical signal.

Each photo-sensitive pixel includes a PIN diode which converts light of a visible light region converted from the X-ray by a scintillator into an electronic signal and outputs the electronic signal, and a thin-film transistor TFT which transmits a detected signal output from the PIN diode to the readout circuitry 150. One end of the PIN diode may be connected to the thin-film transistor and the other end thereof may be connected to a bias line BL.

A gate electrode of the thin-film transistor may be connected to the gate line GL which carries a scan signal. Source/drain electrodes of the thin-film transistor may be respectively connected to the PIN diode and a data line DL which carries the detected signal output from the PIN diode. Each bias line BL may extend in a parallel manner to each data line DL.

The gate driver 120 may sequentially apply gate signals to thin-film transistors of photo-sensitive pixels through the gate lines GLs. The thin-film transistors of the photo-sensitive pixels may be turned on in response to the gate signals having a gate-on voltage level.

The bias supply 130 may apply driving voltages to the photo-sensitive pixels through the bias lines BL. The bias supply 130 may selectively apply a reverse bias or a forward bias to the PIN diode.

The readout circuitry 150 may read out the detected signal transmitted from the thin-film transistor turned on in response to the gate signal of the gate driver. That is, the detected signal output from the PIN diode may be input to the readout circuitry 150 through the thin-film transistor and the data line DL.

The readout circuitry 150 may read out the detected signal output from each of the photo-sensitive pixels during an offset readout period for reading out an offset image and an X-ray readout period for reading out the detected signal after an X-ray exposure.

The readout circuitry 150 may include a signal detector and a multiplexer. The signal detector includes a plurality of amplification circuits that correspond respectively to the data lines DL. Each amplification circuit may include an amplifier, a capacitor, and a reset element.

The timing controller 160 may generate an initiation signal and a clock signal and supply the initiation signal and the clock signal to the gate driver 120 to control an operation of the gate driver 120. Further, the timing controller 160 may generate a readout control signal and a readout clock signal, and may supply the readout control signal and the readout clock signal to the readout circuitry 150 to control an operation of the readout circuitry 150.

Figure 2:
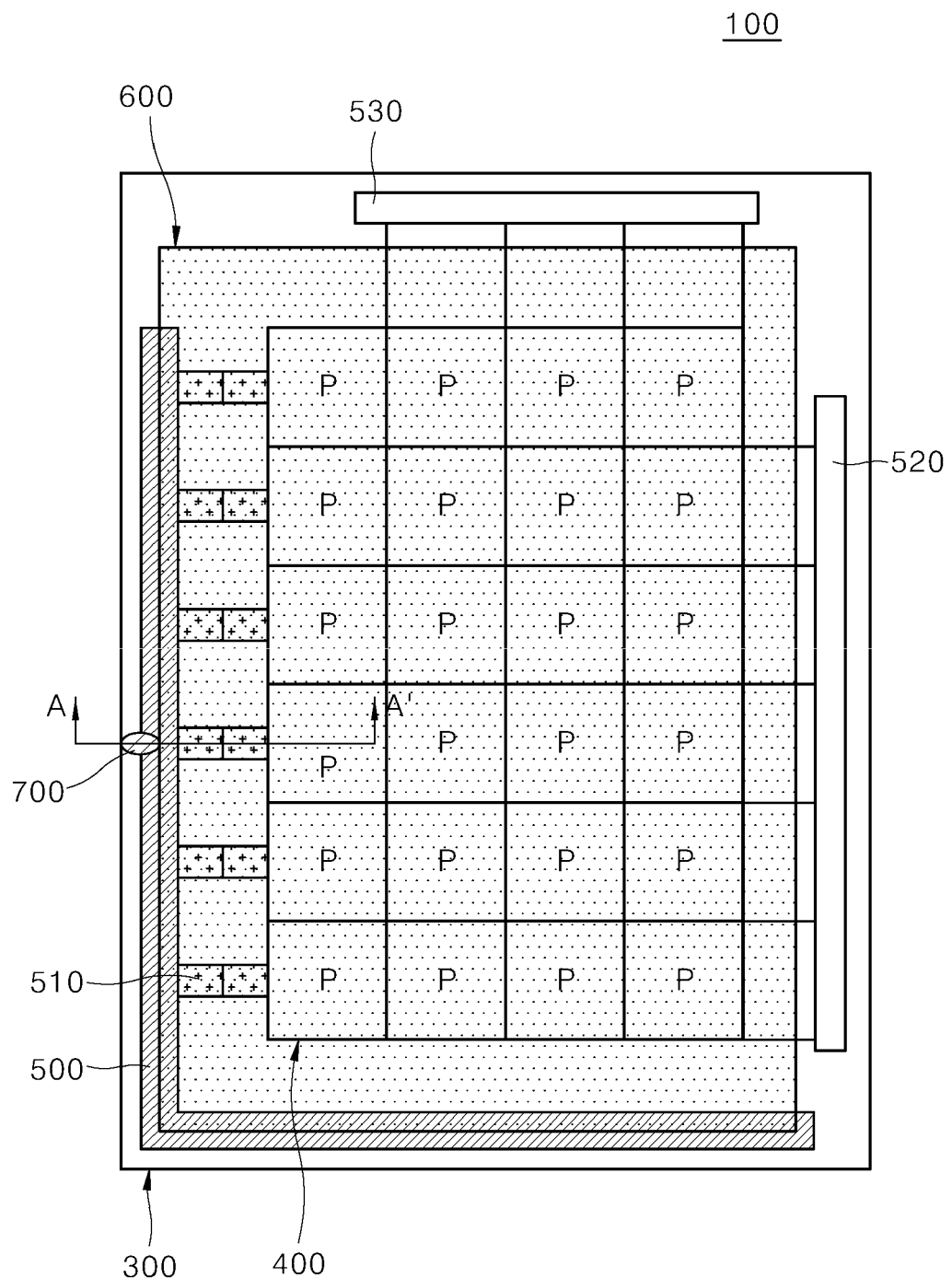
FIG. 2 shows a top view of a digital X-ray detector according to a first embodiment of the present disclosure.
Figure 3:
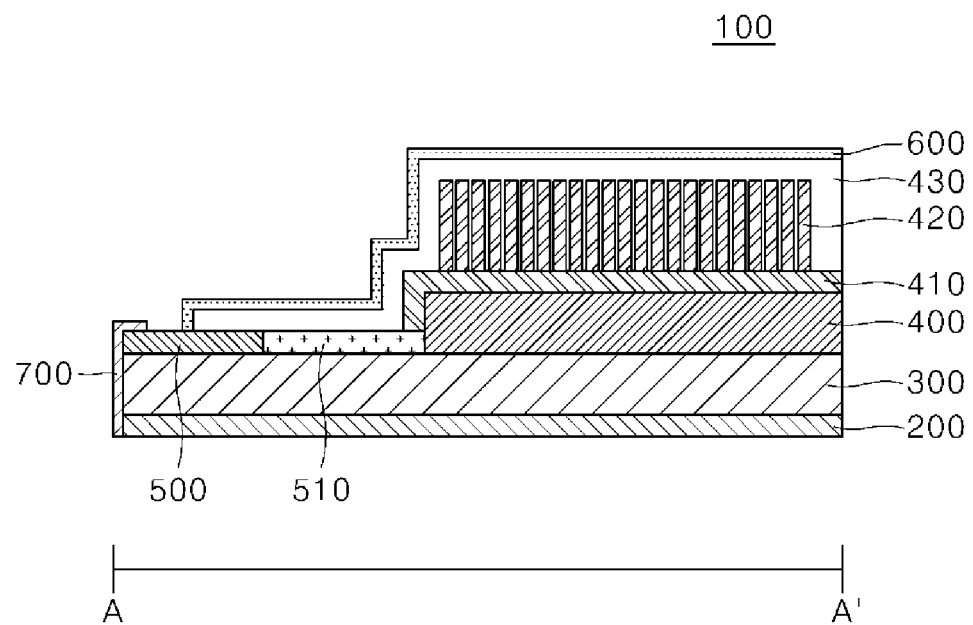
FIG. 3 is a cross-sectional view of a digital X-ray detector along an arrow AA' in FIG. 2 according to a first embodiment of the present disclosure.
Figure 4:
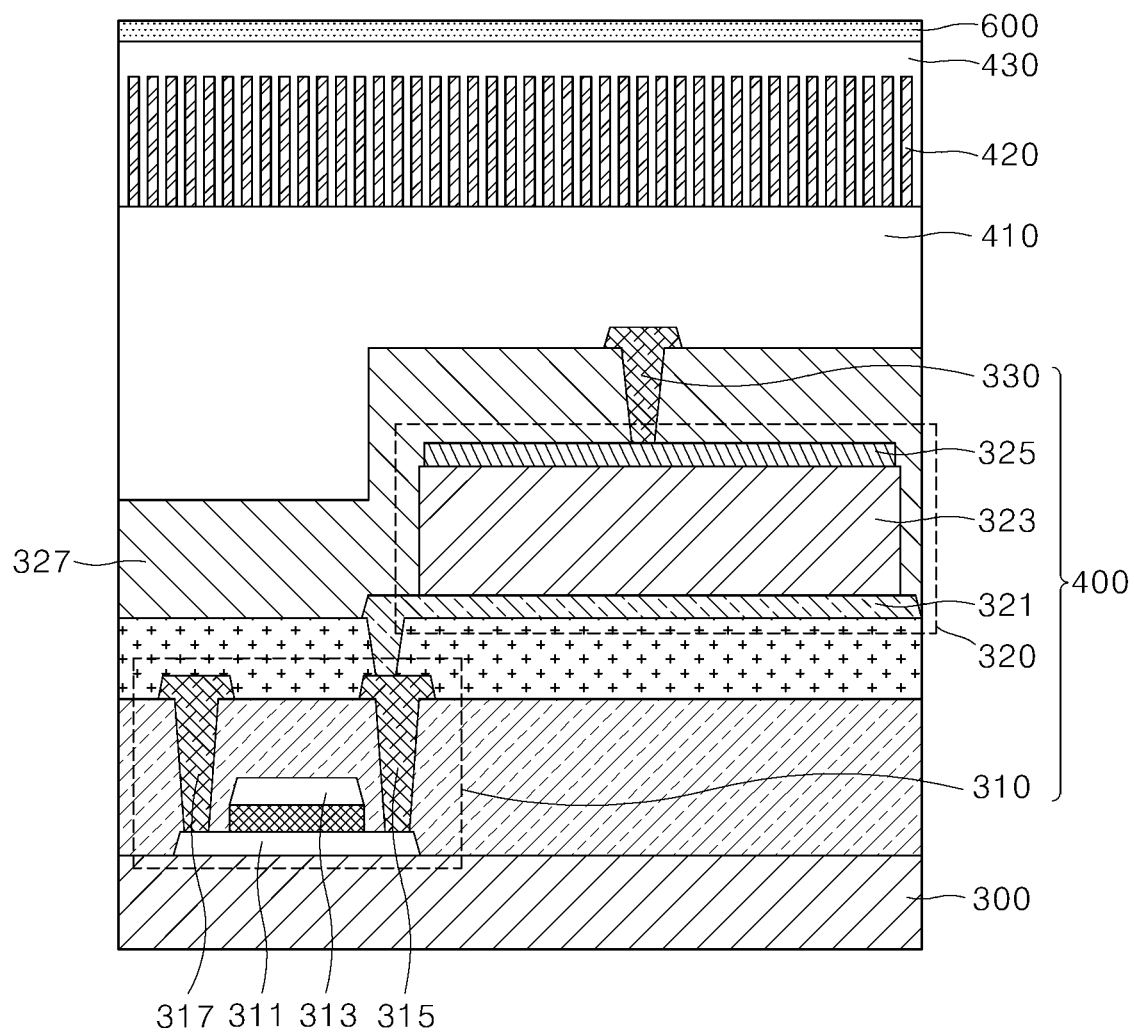
FIG. 4 is an enlarged cross-sectional view of an elements-array region of a digital X-ray detector in accordance with a first embodiment of the present disclosure.

FIG. 2 and FIG. 3 are top and cross-sectional views of a digital X-ray detector 100 according to a first embodiment of the present disclosure, respectively. FIG. 4 is an enlarged cross-sectional view of an elements-array region of a digital X-ray detector in accordance with a first embodiment of the present disclosure.

The digital X-ray detector 100 according to the first embodiment of the present disclosure may include a base substrate 300, a metal layer 200 disposed on a bottom face (or bottom surface) of the base substrate 300, an elements-array 400 disposed on a top face (or top surface) of the base substrate 300, a ground electrode 500 disposed on the base substrate 300 and electrically connected to the elements-array 400, a scintillator layer 420 disposed on the elements-array 400, and a reflective plate 600 disposed on the scintillator layer 420.

According to the first embodiment of the present disclosure, a glass substrate may be used as the base substrate 300.

The metal layer 200 may be disposed under the base substrate 300.

The metal layer 200 may be formed of a metal material such as molybdenum (Mo), aluminum (Al), or ITO. The metal layer 200 may be formed by vapor deposition or coating by way of example.

In some embodiments, the metal layer 200 may be formed on an entire surface of the base substrate 300. However, the present disclosure is not limited thereto. For example, the metal layer 200 may be patterned.

The metal layer 200 is used to reduce defects due to static-electricity generated in the digital X-ray detector 100. The metal layer 200 may be electrically connected to the elements-array 400 and to the reflective plate 600 covering or partially covering the elements-array 400.

Thus, the metal layer 200 may serve as a ground for decreasing or eliminating the static electricity. Thus, in one or more embodiments, the metal layer 200 is formed on an entire surface of the base substrate 300 in order to increase or maximize the ground effect.

Referring to FIG. 4, on the base substrate 300, there may be the elements-array 400 including a thin-film transistor 310 and a PIN diode 320 connected to the thin-film transistor 310.

Between the base substrate 300 and the elements-array 400, there may be a buffer layer made of inorganic material.

In this case, a pad area including various wirings may be disposed on an edge region of the base substrate 300. Thus, the elements-array 400 may be formed in an active region except for the edge region of the base substrate 300.

The elements-array 400 has a plurality of pixel regions defined by intersection between gate lines extending in a first direction and data lines extending in a second direction orthogonal to the first direction. In each pixel region, each thin-film transistor 310 and each PIN diode 320 may be arranged to be connected to each other.

Referring to FIG. 4, the thin-film transistor 310 may include an active layer 311, a gate electrode 313, source/drain electrodes 317 and 315, and may serve as a driving thin-film transistor 310 for driving the PIN diode 320.

The active layer 311 may be formed of an oxide semiconductor material such as IGZO (indium gallium zinc oxide), low-temperature polycrystalline silicon (LTPS) or amorphous silicon (a-Si).

The thin-film transistor 310 may be connected to the PIN diode 320 including a lower electrode 321, a PIN layer 323, and an upper electrode 325.

Specifically, the lower electrode 321 may be connected to the drain electrode 315 of the thin-film transistor 310. The PIN layer 323 may be formed by stacking an N (negative) type semiconductor layer including an N type impurity, an I (intrinsic) type semiconductor layer including no impurity, and a P (positive) type semiconductor layer including a P type impurity.

The PIN layer 323 includes a material capable of converting an X-ray emitted from an energy source into an electrical signal. For example, the PIN layer 323 may include a-Se, $HgI_2$, CdTe, PbO, $PbI_2$, $BiI_3$, GaAs, and Ge.

On the upper electrode 325, a passivation layer 327 composed of multiple layers or a single layer made of silicon oxide $SiO_x$ or silicon nitride $SiN_x$ may be disposed. The passivation layer 327 may be disposed to cover or partially cover the elements-array 400 to protect the elements-array 400.

A bias electrode 330 may be formed on the passivation layer 327. The bias electrode 330 may be connected to the upper electrode 325 of the PIN diode 320 for applying a bias voltage to the PIN diode 320.

The above internal structure of the elements-array 400 is merely an embodiment, and the present disclosure is not limited thereto. Arrangement of the elements such as the thin-film transistor 310, the PIN diode 320 and the bias electrode 330 included in the elements-array 400 may include various variations.

The ground electrode 500 may be formed on the base substrate 300 in a location corresponding to a non-active area other than the active region where the elements-array 400 is placed.

The ground electrode 500 may allow static electricity, which may be generated during production, testing, and use of the digital X-ray detector 100, to escape to a ground GND via the ground electrode 500.

Therefore, to reduce or minimize failure due to static-electricity that may occur in the elements-array 400, the ground electrode 500 may be electrically connected to the elements-array 400 to allow the static-electricity generated by the elements-array 400 to escape to the ground.

In this case, on the base substrate 300, static-electricity inhibition circuitry 510 may be disposed between the ground electrode 500 and the elements-array 400. The static-electricity inhibition circuitry 510 may electrically connect the ground electrode 500 and the elements-array 400 to each other, such that the failure due to static-electricity can be further reduced or minimized.

The static-electricity inhibition circuitry 510 may include an electrostatic discharge (ESD) circuit including a selected number of thin-film transistors. A person of ordinary skill in the art may select the number of thin-film transistors to be utilized to achieve the functions and the operations of the ESD circuit or the static-electricity inhibition circuitry 510 explained throughout the present disclosure. In this case, parasitic bipolar junction transistors may be used as the thin-film transistors, but the present disclosure is not limited thereto.

Specifically, when static-electricity occurs in the elements-array 400 and thus a high-voltage or over-current above a certain level flows instantaneously therein, the static-electricity inhibition circuitry 510 may allow the elements-array 400 and the ground electrode 500 to be connected to each other to cause the static-electricity to escape to the ground via the ground electrode 500.

The ground electrode 500 may be formed along a periphery of the non-active region of the base substrate 300. This configuration may allow the static-electricity not to be concentrated on one point but to be distributed across a region as wide as possible.

In this case, a gate pad area 520 may be formed in a portion of an edge region of the non-active region of the base substrate 300. A readout driver 530 may be formed in another portion of the edge region of the base substrate 300. Thus, the ground electrode 500 may be formed in a portion of the non-active region in which the gate pad area 520 and the readout driver 530 are not disposed.

On the elements-array 400, an organic material layer 410 may be disposed to cover or partially cover the elements-array 400.

The organic material layer 410 may reduce a step which may otherwise occur due to arrangement of elements included in the elements-array 400. The organic material layer 410 may also serve as a planarization layer that allows the scintillator layer 420 to be formed on a planarized top surface thereof.

Further, the organic material layer 410 may serve as a growth-base layer allowing the scintillator material to be formed into a plurality of columnar crystals based on the organic material layer 410.

Accordingly, the scintillator layer 420 may be grown in a vertical direction into the plurality of columnar crystals via a deposition scheme while using the organic material layer 410 as the growth-base layer. Thus, the plurality of scintillator columnar crystals may be formed in a side-by-side arrangement on the growth-base layer.

For example, a seed for forming each scintillator columnar crystal is first formed on the organic material layer 410. Then, scintillator material may be grown on the seed in such a manner that the scintillator columnar crystals are arranged side by side in the horizontal direction, such that the scintillator layer 420 composed of the horizontal arrangement of the scintillator columnar crystals may be formed. In this case, the scintillator material may include material such as cesium iodide (CsI), but is not limited thereto.

However, the scheme of forming the scintillator layer 420 is not limited thereto. In another example, a scheme of bonding separate scintillator films made of the scintillator material to each other may be employed.

On the scintillator layer 420, a protective layer 430 covering or partially covering the scintillator layer 420 and the elements-array 400 may be formed, so that the scintillator layer 420 may have a stronger bearing ability. The protective layer 430 may be formed of parylene. The protective layer 430 may cover or partially cover the scintillator layer 420 composed of the arrangement of the plurality of columnar crystals. In this connection, the protective layer 430 may fill a gap between adjacent scintillator columnar crystals.

The reflective plate 600 may be further disposed on the protective layer 430 to cover or partially cover the protective layer 430. The reflective plate 600 may receive and reflect visible light converted from X-ray incident on the scintillator layer 420 by the scintillator layer 420 back to the inside of the detector 100 so that the visible light does not escape to the outside of the detector 100. This may improve the light efficiency of the detector.

The reflective plate 600 may be made of a highly reflective metal such as aluminum (Al). However, other materials such as metal or non-metal materials having the same high reflectivity characteristics may be used.

In some embodiments, each of the protective layer 430 and the reflective plate 600 may be disposed to cover the entire surface of the base substrate 300 except for the pad areas disposed in the non-active regions of the elements-array 400. In other embodiments, each of the protective layer 430 and the reflective plate 600 is disposed to cover one surface of the base substrate 300 entirely except for the pad areas disposed in the non-active regions of the elements-array 400.

The reflective plate 600 may be formed to cover at least a partial region of the ground electrode 500 and may be electrically connected to the ground electrode 500.

In addition to the static-electricity that may be generated in the production process of the elements-array 400 as described above, static-electricity may be further generated in an entire production process of the digital X-ray detector 100 including the formation process of the scintillator layer 420.

Further, when the X-ray is irradiated to the digital X-ray detector 100, charges may be generated and accumulated on the reflective plate 600. In this connection, the charges accumulated on the reflective plate 600 may not be effectively discharged out. Thus, the static-electricity problem due to the charge accumulation on the reflective plate 600 may occur.

Accordingly, in accordance with the present disclosure, the reflective plate 600 may be electrically connected to the ground electrode 500 to allow the static-electricity generated on the reflective plate 600 to escape to the ground.

Thus, the ground electrode 500 according to the present disclosure is electrically connected to the elements-array 400 and the reflective plate 600, such that the static-electricity generated from the elements-array 400 and the reflective plate 600 may escape to the ground.

In addition, the ground electrode 500 is electrically connected to the metal layer 200 under the base substrate 300, such that the static-electricity may be discharged out to the ground more effectively.

In one or more embodiments, in order to allow the static-electricity to escape efficiently to the ground, the ground electrode may have an area as large as possible.

According to the present disclosure, the ground electrode 500 serves as a primary ground for receiving the static electricity.

However, since the ground electrode 500 is formed on a non-active region of the base substrate 300 having the considerable active region, it may be difficult to obtain a large ground electrode on the non-active region.

Accordingly, in accordance with the present disclosure, the metal layer 200 is formed under the base substrate 300. The metal layer 200 is electrically connected to the ground electrode 500. Thus, the area of the ground region can be increased or maximized to further reduce or minimize electrostatic defects.

According to the present disclosure, a static-electricity discharge path along which the static-electricity from the reflective plate 600 moves through the ground electrode 500 to the metal layer 200 may be secured. This may reduce both the static-electricity generated from the top and bottom of the digital X-ray detector 100.

Further, in accordance with the present disclosure, the static-electricity discharge path along which the static-electricity from the reflective plate 600 moves through the ground electrode 500 to the metal layer 200 may be secured. This may increase or maximize the effective ground region, such that the static-electricity generated from the top and bottom of the digital X-ray detector 100 can be more efficiently discharged out.

The ground electrode 500 may be electrically connected to the metal layer 200 via a conductive layer 700.

Specifically, the conductive layer 700 may be formed of a silver (Ag) paste or a silver (Ag) film.

The digital X-ray detector 100 according to the present disclosure operates as follows.

The X-rays irradiated onto the digital X-ray detector 100 are converted into light of the visible-light region by the scintillator layer 420. The light of the visible-light region is converted, via the PIN layer 323 of the PIN diode 320, to an electrical signal.

Specifically, when light of the visible-light region is irradiated to the PIN layer 323, the I-type semiconductor layer is depleted by the P-type semiconductor layer and the N-type semiconductor layer, such that an electric field is generated therein. Then, holes and electrons generated by the light are drifted by the electric field and then are collected into the P type semiconductor layer and the N type semiconductor layer, respectively.

The PIN diode 320 converts the light of the visible-light region into the electrical signal and transmits the electrical signal to the thin-film transistor 310. The electrical signal as thus transmitted passes through the data line connected to the thin-film transistor 310 and then is displayed as a video signal.

Figure 5:
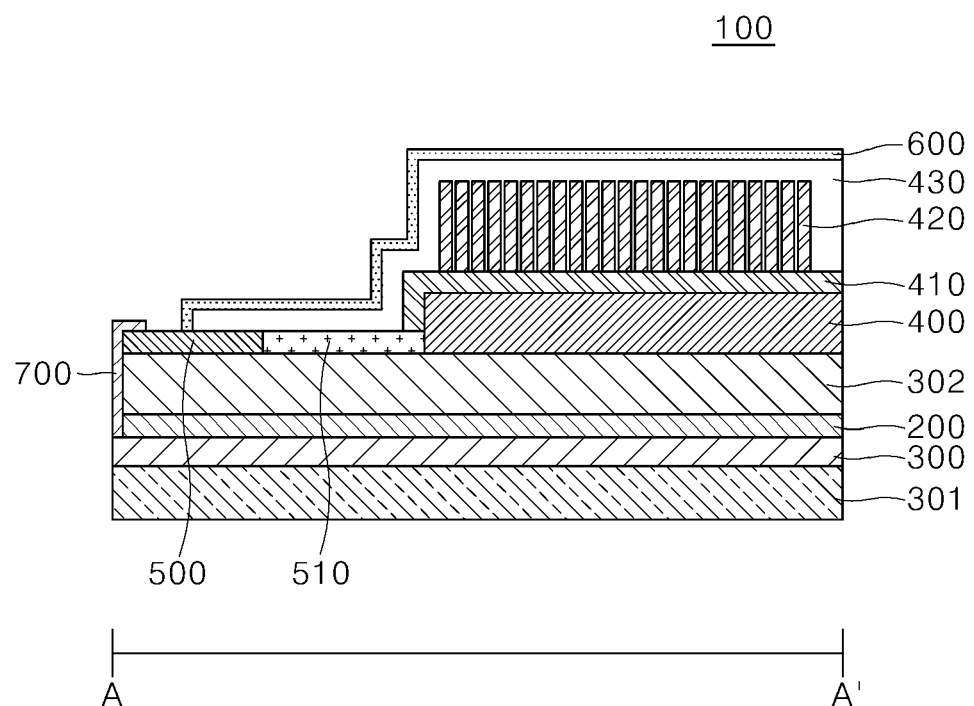
FIG. 5 is a cross-sectional view of a digital X-ray detector along an arrow AA' in FIG. 2 according to a second embodiment of the present disclosure.

FIG. 5 is a cross-sectional view of a digital X-ray detector 100 according to a second embodiment of the present disclosure.

The digital X-ray detector 100 in accordance with the second embodiment of the present disclosure may include a base substrate 300, a metal layer 200 on a top face of the base substrate 300, a multi-buffer layer 302 on the metal layer 200, an elements-array 400 on the multi-buffer layer 302, a ground electrode 500 disposed on the multi-buffer layer 302 and electrically connected to the elements-array 400, a scintillator layer 420 disposed on the elements-array 400, and a reflective plate 600 disposed on the scintillator layer 420. The multi-buffer layer 302 is used to include one or more buffer layers in the present disclosure.

The digital X-ray detector 100 according to the second embodiment will be described in detail with respect to configurations that differ from those of the digital X-ray detector 100 according to the first embodiment as described above. The corresponding configurations of the digital X-ray detector 100 according to the first embodiment as described above may be equally applied to the configurations of the second embodiment whose descriptions will be omitted.

The digital X-ray detector 100 according to the second embodiment of the present disclosure may be embodied as a flexible type digital X-ray detector 100.

Accordingly, the base substrate 300 according to the second embodiment of the present disclosure may be made of an organic material having a flexible property. For example, a polyimide (PI) based substrate may be employed.

A back plate 301 may be additionally formed under the base substrate 300 for the purpose of protecting and supporting the polyimide substrate made of an organic material.

The back plate 301 may be formed of a material such as polyethylene terephthalate (PET).

The metal layer 200 may be disposed on a top face of the base substrate 300.

The metal layer 200 is used to reduce defects due to static-electricity generated in the digital X-ray detector 100. The metal layer 200 may be electrically connected to the elements-array 400 and to the reflective plate 600 on the elements-array 400.

Especially, when the polyimide substrate is made of an organic material, friction based static-electricity resulting from friction against the polyimide may be generated considerably. Thus, the elements-array 400 and metal layer 200 may be electrically connected to each other to allow the static-electricity to escape to the outside of the detector.

Thus, the metal layer 200 may serve as a ground for decreasing or eliminating static electricity. Thus, in one or more embodiments, metal layer 200 to covers one surface of the base substrate 300 entirely in order to increase or maximize the ground effect. For example, as shown in the figures, the metal layer 200 may be disposed under the base substrate 300 and entirely cover the bottom surface of the base substrate 300.

Further, the metal layer 200 is formed on the polyimide substrate. The metal layer 200 may serve as an impurity diffusion inhibition layer that reduces or minimizes the penetration of the organic material polyimide based impurities into the elements-array 400.

The multi-buffer layer 302 may be formed on the metal layer 200.

The multi-buffer layer 302 may be configured such that a silicon oxide layer $SiO_x$ and a silicon nitride layer $SiN_x$ are alternately stacked with each other to form a stack of at least three layers.

For example, the buffer layer may have various stack configurations such as $SiO_x/SiN_x/SiO_x$, $SiN_x/SiO_x/SiN_x$, $SiO_x/SiN_x/SiO_x/SiN_x$, and $SiN_x/SiO_x/SiN_x/SiO_x$.

The multi-buffer layer 302 in which the silicon oxide layer $SiO_x$ and silicon nitride layer SiNx are alternately stacked with each other to form a stack of at least three layers, may further reduce or minimize the influence of external moisture and oxygen penetration on the elements of the elements-array 400.

On the multi-buffer layer 302, there may be the elements-array 400 including the thin-film transistors 310 and the PIN diodes 320 connected to the thin-film transistors 310 respectively.

In this case, a pad area including various wirings may be disposed on an edge region of the base substrate 300. Thus, the elements-array 400 may be formed in an active region except for the edge region of the base substrate 300.

The elements-array 400 has a plurality of pixel regions defined by intersection between gate lines extending in a first direction and data lines extending in a second direction orthogonal to the first direction. In each pixel region, each thin-film transistor 310 and each PIN diode 320 may be arranged to be connected to each other.

The ground electrode 500 may be formed on the multi-buffer layer 302 in a location corresponding to a non-active area other than the active region where the elements-array 400 is placed.

The ground electrode 500 may allow static electricity, which may be generated during production, testing, and use of the digital X-ray detector 100, to escape to a ground GND via the ground electrode 500.

Therefore, to reduce or minimize failure due to static-electricity that may occur in the elements-array 400, the ground electrode 500 may be electrically connected to the elements-array 400 to allow the static-electricity generated from the elements-array 400 to escape to the ground.

In this case, on the multi-buffer layer 302, static-electricity inhibition circuitry 510 may be disposed between the ground electrode 500 and the elements-array 400. The static-electricity inhibition circuitry 510 may electrically connect the ground electrode 500 and the elements-array 400 to each other, such that the failure due to static-electricity can be further reduced or minimized.

The ground electrode 500 may be formed along a periphery of the non-active region of the multi-buffer layer 302. This configuration may allow the static-electricity not to be concentrated on one point but to be distributed across a region as wide as possible.

In this case, a gate pad area 520 may be formed in a portion of an edge region of the non-active region of the multi buffer layer 302. A readout driver 530 may be formed in another portion of the edge region of the multi buffer layer 302. Thus, the ground electrode 500 may be formed in a portion of the non-active region in which the gate pad area 520 and the readout driver 530 are not disposed.

On the elements-array 400, an organic material layer 410 may be disposed to cover or partially cover the elements-array 400.

The organic material layer 410 may reduce a step which may otherwise occur due to arrangement of elements included in the elements-array 400. The organic material layer 410 may also serve as a planarization layer that allows the scintillator layer 420 to be formed on a planarized top surface thereof. Further, the organic material layer 410 may serve as a growth-base layer allowing the scintillator material to be formed into a plurality of columnar crystals based on the organic material layer 410.

On the scintillator layer 420, a protective layer 430 covering or partially covering the scintillator layer 420 and the elements-array 400 may be formed, so that the scintillator layer 420 may have a stronger bearing ability.

The reflective plate 600 may be further disposed on the protective layer 430 to cover or partially cover the protective layer 430. The reflective plate 600 may receive and reflect visible light converted from X-ray incident on the scintillator layer 420 by the scintillator layer 420 back to the inside of the detector 100 so that the visible light does not escape to the outside of the detector 100. This may improve the light efficiency of the detector.

The reflective plate 600 may be made of a highly reflective metal such as aluminum (Al).

Each of the protective layer 430 and the reflective plate 600 may be disposed to cover or partially cover the entire surface of the multi buffer layer 302 except for the pad areas disposed in the non-active regions of the elements-array 400.

The reflective plate 600 may be formed to cover at least a partial region of the ground electrode 500 and may be electrically connected to the ground electrode 500.

Accordingly, in accordance with the present disclosure, the reflective plate 600 may be electrically connected to the ground electrode 500 to allow the static-electricity generated on the reflective plate 600 to escape to the ground.

Thus, the ground electrode 500 according to the present disclosure is electrically connected to the elements-array 400 and the reflective plate 600, such that the static-electricity generated from the elements-array 400 and the reflective plate 600 may escape to the ground.

In addition, the ground electrode 500 is electrically connected to the metal layer 200 below the multi buffer layer 302, such that the static-electricity may be discharged out to the ground more effectively.

In order to allow the static-electricity to escape efficiently to the ground, the ground electrode is formed to have an area as large as possible.

According to the present disclosure, the ground electrode 500 serves as a primary ground for receiving the static electricity.

However, since the ground electrode 500 is formed on a non-active region of the multi-buffer layer 302 having the considerable active region, it may be difficult to obtain a large ground electrode on the non-active region thereof.

Accordingly, in accordance with the present disclosure, the metal layer 200 is formed under the multi buffer layer 302. The metal layer 200 is electrically connected to the ground electrode 500. Thus, the area of the ground region can be increased or maximized to further reduce or minimize electrostatic defects.

According to the present disclosure, a static-electricity discharge path along which the static-electricity from the reflective plate 600 moves through the ground electrode 500 to the metal layer 200 may be secured. This may reduce both the static-electricity generated from the top and bottom of the digital X-ray detector 100.

Further, in accordance with the present disclosure, the static-electricity discharge path along which the static-electricity from the reflective plate 600 moves through the ground electrode 500 to the metal layer 200 may be secured. This may increase or maximize the effective ground region, such that the static-electricity generated from the top and bottom of the digital X-ray detector 100 can be more efficiently discharged out.

The ground electrode 500 may be electrically connected to the metal layer 200 via the conductive layer 700.

The present disclosure is described with reference to the drawings and embodiments. However, the present disclosure is not limited to the embodiments and drawings disclosed herein. It will be apparent that various modifications may be made thereto by those skilled in the art within the scope of the present disclosure. Furthermore, although the effects resulting from the configurations of the present disclosure have not been explicitly specified in describing the effect resulting from the configurations of the present disclosure, the effects expected from the configurations of the present disclosure should be recognized.

The various embodiments described above can be combined to provide further embodiments. Further changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A digital X-ray detector comprising:
   a base substrate having a top surface and a bottom surface opposite the top surface;
   a metal layer disposed on the bottom surface of the base substrate;
   an elements-array disposed on the top surface of the base substrate, wherein the elements-array includes thin-film transistors and PIN diodes electrically connected to the thin-film transistors;

a ground electrode disposed on the top surface of the base substrate in a location corresponding to a non-active area other than the active region where the elements-array is placed and electrically connected to the elements-array;

a scintillator layer disposed on the elements-array; and a reflective plate disposed on the scintillator layer, wherein the reflective plate is electrically connected to the ground electrode, and wherein the ground electrode is electrically connected to the metal layer.

2. The digital X-ray detector of claim 1, wherein the base substrate includes a glass substrate.

3. The digital X-ray detector of claim 1, wherein the digital X-ray detector further comprises a static-electricity inhibition circuitry disposed on the top surface of the base substrate, and wherein the elements-array and the ground electrode are electrically connected to each other via the static-electricity inhibition circuitry.

4. The digital X-ray detector of claim 1, wherein the ground electrode and the metal layer are electrically connected to each other via a conductive layer.

5. The digital X-ray detector of claim 4, wherein the conductive layer is formed at least one of a silver paste or a silver film.

6. A digital X-ray detector comprising:
a base substrate;
a metal layer on the base substrate;
one or more buffer layers on the metal layer;
an element-array disposed on the buffer layers, the element-array including thin-film transistors and PIN diodes electrically connected to the thin-film transistors;
a ground electrode disposed on the buffer layers, the ground electrode being electrically connected to the element-array;
a scintillator layer on the elements-array; and
a reflective plate on the scintillator layer,
wherein the reflective plate is electrically connected to the ground electrode, and
wherein the ground electrode is electrically connected to the metal layer.

7. The digital X-ray detector of claim 6, wherein the base substrate includes a polyimide substrate.

8. The digital X-ray detector of claim 6, wherein the buffer layers include a vertical alternate stack of a silicon oxide layer ($SiO_x$) and a silicon nitride layer ($SiN_x$).

9. The digital X-ray detector of claim 6, wherein the digital X-ray detector further comprises a static-electricity inhibition circuitry disposed on the buffer layers, and wherein the elements-array and the ground electrode are electrically connected to each other via the static-electricity inhibition circuitry.

10. The digital X-ray detector of claim 6, wherein the ground electrode and the metal layer are electrically connected to each other via a conductive layer.

11. The digital X-ray detector of claim 10, wherein the conductive layer is formed of a silver paste or a silver film.

* * * * *